United States Patent [19]

Genaw et al.

[11] Patent Number: 5,033,993

[45] Date of Patent: Jul. 23, 1991

[54] POSITIVE, DRIVE CONVERSION KIT FOR MOTORIZED WHEELCHAIR

[75] Inventors: Randy D. Genaw, West Allis; Mark A. Kappel, Milwaukee; Christopher J. Wieloch, Brookfield; Thomas J. Pokrzywinski, Milwaukee, all of Wis.

[73] Assignee: Handi-Trak Incorporated, West Allis, Wis.

[21] Appl. No.: 570,280

[22] Filed: Aug. 17, 1990

[51] Int. Cl.[5] .......................... F16G 1/00; A61G 5/00

[52] U.S. Cl. .................................. 474/153; 280/250.1

[58] Field of Search ....................... 474/153, 152, 148; 280/250.1, 304.1

[56] References Cited

U.S. PATENT DOCUMENTS

| | | | |
|---|---|---|---|
| 3,002,396 | 10/1961 | Worrall, Jr. | 474/153 X |
| 4,431,076 | 2/1984 | Simpson | 280/250.1 |
| 4,455,031 | 6/1984 | Hosaka | 280/250.1 |

*Primary Examiner*—Thuy M. Bui

*Attorney, Agent, or Firm*—Foley & Lardner

[57] ABSTRACT

A conversion kit for connecting a friction drive system for a motorized wheelchair to a positive drive system which includes a cog wheel, a strip of metallic material having a number of cogs stamped at equally spaced intervals and a belt having internal cogs for matingly engaging the cog wheel and metallic strip and the method of conversion.

12 Claims, 1 Drawing Sheet

POSITIVE, DRIVE CONVERSION KIT FOR MOTORIZED WHEELCHAIR

FIELD OF THE INVENTION

The present invention relates to motorized wheelchairs and more particularly to a conversion kit for converting the friction drive system of the wheelchair to a positive drive system.

BACKGROUND OF THE INVENTION

Motorized wheelchairs are used extensively by the handicapped for transportation, both indoors and outdoors. Wheelchairs are generally driven by battery operated motors which are connected by rubberized belts to the pulleys provided on the rear wheels. These belts are generally known as friction type drive belts having a generally rectangular cross section. The belts are mounted in the grooves of the same shape provided in both the drive pulley and the driven pulley. It is generally understood that the drive surface of this type of belt should be flush with the base of the pulley groove. As the belt ages it experiences both wear and fatigue, resulting in stretching of the belt, which results in slipping of the belt in the grooves of the pulleys. Belt tighteners are often provided; however, once the belt has aged sufficiently to slip, the belt must be replaced. Even when new, if the belts become wet, which often occurs when the wheelchair is used out of doors or sweats as the result of a change in environment, the belt also slips and must be wiped down in order to attain sufficient friction to drive the chair.

SUMMARY OF THE PRESENT INVENTION

The present invention advantageously provides a conversion kit for converting a friction belt drive system for a motorized wheelchair to a positive drive system which is simple in construction, economical to manufacture, and requires a minimum of effort for conversion in a quick and easy manner. Positive drive as used herein refers to a physical or mechanical connection between the drive belt and the pulleys. The present invention advantageously provides a conversion kit which can be quickly and easily substituted for the friction drive system. The kit includes a cog wheel, an elongated metallic strip having equally spaced cogs along its full length, a single screw for securing the strip in the groove of the drive pulley, and a drive belt having cogs equally spaced along its inner periphery for engaging the cog wheel and the strip in the driven pulley.

In accordance with one aspect of the present invention, the elongated strip can be made from a metal strip such as brass which is stamped with equally spaced dimples or cogs wrapped around the driven pulley and secured thereto by a single screw.

Other principal features and advantages of the invention will become apparent to those skilled in the art upon review of the following drawings, the detailed description and the appended claims.

DETAILED DESCRIPTION OF THE DRAWINGS

Figure 1:
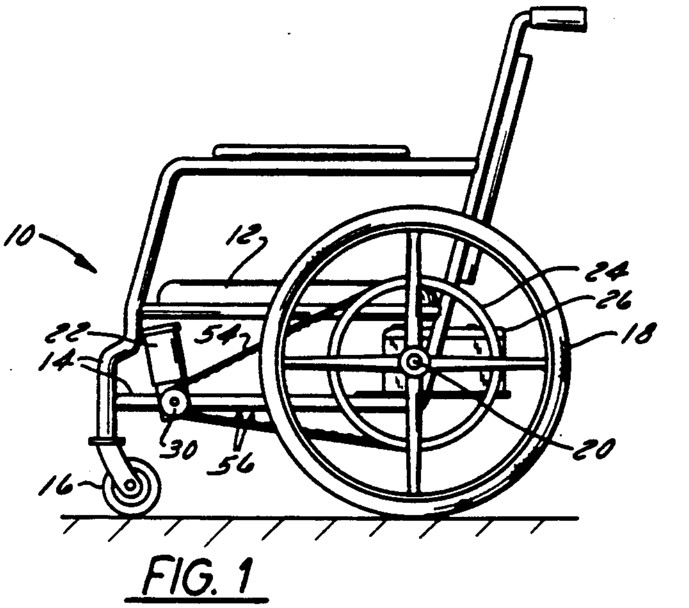
FIG. 1 is a side elevation view of a motorized wheelchair having the positive drive conversion kit according to the present invention mounted thereon.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

Referring to the drawings, a motorized wheelchair 10 of the type contemplated herein is shown in FIG. 1 and generally includes a chair 12 having a supporting frame 14, a pair of swivel type wheels 16 in the front, and a pair of drive wheels 18 mounted on an axle 20 in the back. A driven pulley 24 is provided on the inside of the rear wheel 18. An electric drive motor 22 is provided on each side of the chair which is electrically connected to a battery 26 supported in the back of the chair. Each drive motor includes a drive pulley which is connected to the driven pulley by a belt. A hand operated control lever (not shown) is used to operate the motors. The operation of the motorized chair is well known and involves merely moving the control lever (in the direction in which you want to go) to energize one or both of the motors depending on the intended direction of travel.

Figure 2:
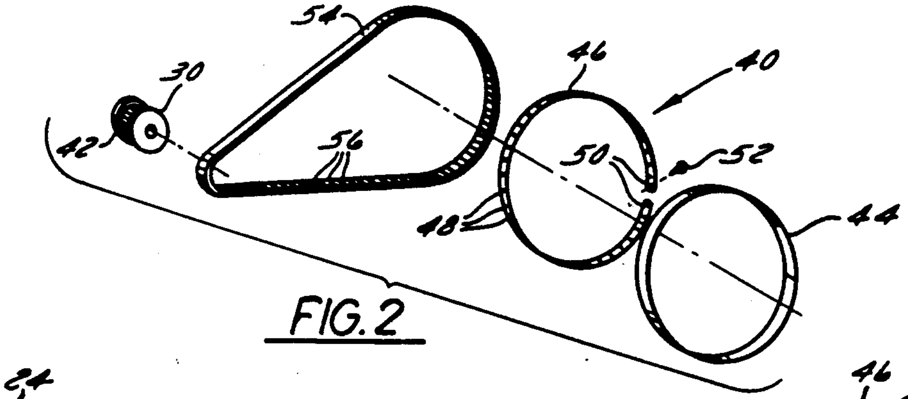
FIG. 2 is an exploded perspective view of the parts of the conversion kit.
Figure 4:
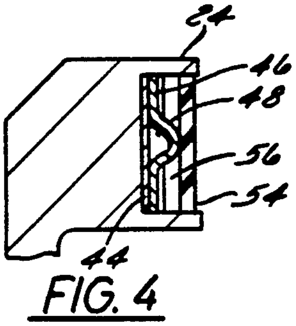
FIG. 4 is a section view of the driven pulley showing a cross section of the cog type strip in the groove.
Figure 5:
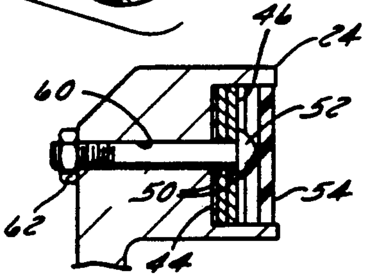
FIG. 5 is a section view showing the screw connection of the metallic strip to the driven pulley.
Figure 3:
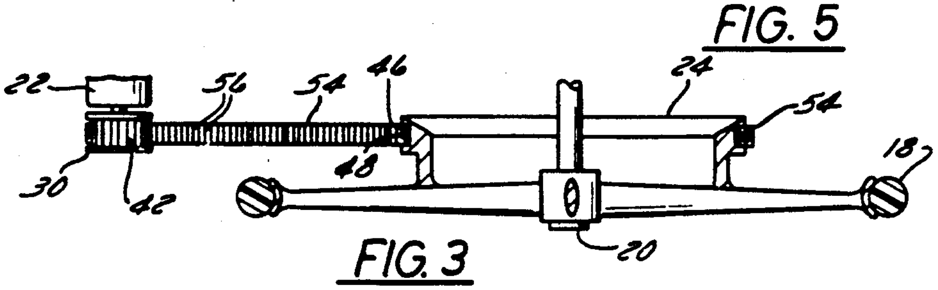
FIG. 3 is a cross section view of the drive system showing the conversion kit.

In accordance with the present invention, the conversion kit 40 as shown in FIG. 2 includes a cog wheel 30 having cogs 42 equally spaced around the wheel; a strip of flexible material 44 such as masking tape or rubberized material; a strip of metallic material 46 having a plurality of dimples or cogs 48 equally spaced along the length of the strip, an opening or hole 50 is provided at each end of the strip; a screw 52; and a drive belt 54 having a row of equally spaced cogs 56 around the interior of the belt.

In accordance with the invention, the conversion of the wheelchair to a positive drive system involves the steps of replacing the drive pulley with the cog wheel 30; wrapping the flexible material 44 around the interior of the driven pulley 24 to provide a cushion for the strip of material 46; drilling a hole 60 through the driven pulley 24 and the cushion material 46; wrapping the band of metallic material 46 around the cushion material 46 and overlapping the ends with the holes 50 aligned with the hole 60 in the driven pulley; inserting the screw 52 through the holes 50 in the band and the hole 60 in the pulley; (a nut 62 may be used to hold the screw in place) and weaving the belt 54 around the cog wheel 30 and the band 46 in the driven pulley 24. A positive mechanical interengagement is provided between the cogs 56 on belt 54 and the cogs 42 on the cog wheel 30 and the cogs 48 on the band 46.

In an alternate embodiment of the invention, the metallic strip may be eliminated and replaced by a series of pins mounted at equally spaced intervals in the rim of the groove and arranged in a parallel relation to the axis of the driven pulley. The pins being located at intervals corresponding to the spacing of the cogs on the belt.

Thus, it should be apparent that there has been provided in accordance with the present invention a positive drive conversion kit for motorized wheelchair and a method of conversion that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A conversion kit for a motorized wheelchair comprising:

a cog wheel;

a strip of material having a plurality of cogs equally spaced along its length;

a screw for securing the strip to a driven pulley; and a belt for positively engaging the cog wheel and the strip whereby a mechanical drive is provided between the cog wheel and the driven pulley.

2. A conversion kit for converting a friction drive system of a motorized vehicle to a positive drive system, the friction drive system including a motor, a drive pulley mounted on said motor, a driven pulley on the rear wheels of the wheel chain and a friction belt, said kit comprising a cog wheel to replace the drive pulley, means for providing cogs in the driven pulley spaced at intervals corresponding to the intervals on said cog wheel, and an endless belt having cogs on the interior thereof equally spaced at intervals corresponding to the intervals between the cogs on the cog wheel to replace the friction belt.

3. The kit according to claim 2 wherein said providing means comprises a strip of metallic material having said cogs stamped thereon.

4. The kit according to claim 2 wherein said providing means comprises a plurality of pins in said driven pulley mounted in a parallel equally spaced relation around the periphery of the driven pulley.

5. A method for converting a friction type drive system for a motorized wheelchair having a drive pulley, a driven pulley and a friction belt, to a mechanical type drive system including the steps of removing the friction belt from the drive and driven pulleys; replacing the drive pulley of the wheelchair with a cog wheel, mounting a metallic strip having equally spaced cogs along its full length on the periphery of the driven pulley, and aligning a belt having equally spaced cogs on the cog wheel and driven pulley.

6. The method according to claim 5 including the step of wrapping a strip of resilient material in the groove of the driven pulley prior to mounting the metallic strip on the driven pulley.

7. A conversion kit for converting the friction drive of a motorized wheelchair to a mechanical drive, said kit comprising:

a cog wheel;

a strip of material having a plurality of cogs;

a means for securing said strip to the wheel pulley; and a belt for positively engaging the cog wheel and the strip whereby a mechanical drive is provided between the cog wheel and the pulley.

8. A conversion kit for converting the friction drive system of a motorized wheelchair to a positive drive system, the friction drive system including a motor, a drive pulley mounted on said motor, a driven pulley mounted on the rear wheels of the wheel chain and a friction belt, said kit comprising a cog wheel to replace the drive pulley, means for providing cogs in the driven pulley spaced at intervals corresponding to the intervals on said cog wheel, and an endless belt having cogs on the interior thereof at intervals corresponding to the intervals between the cogs on the cog wheel.

9. The kit according to claim 8 wherein said providing means comprises a strip of material having said cogs thereon.

10. The kit according to claim 8 wherein said providing means comprises a plurality of pins in said driven pulley mounted in a parallel spaced relation around the periphery of the driven pulley.

11. A method for converting a friction type drive system for a motorized wheelchair having a drive pulley, a driven pulley and a friction belt, to a mechanical type driven system including the steps of removing the friction belt from the drive and driven pulleys; replacing the drive pulley of the wheelchair with a cog wheel, mounting a strip having cogs along its length on the periphery of the driven pulley, and aligning a belt having cogs thereon on the cog wheel and the driven pulley.

12. The method according to claim 11 including the step of wrapping a strip of material in the groove of the driven pulley prior to mounting the cog strip on the driven pulley.

* * * * *